United States Patent Office 3,331,139
Patented July 18, 1967

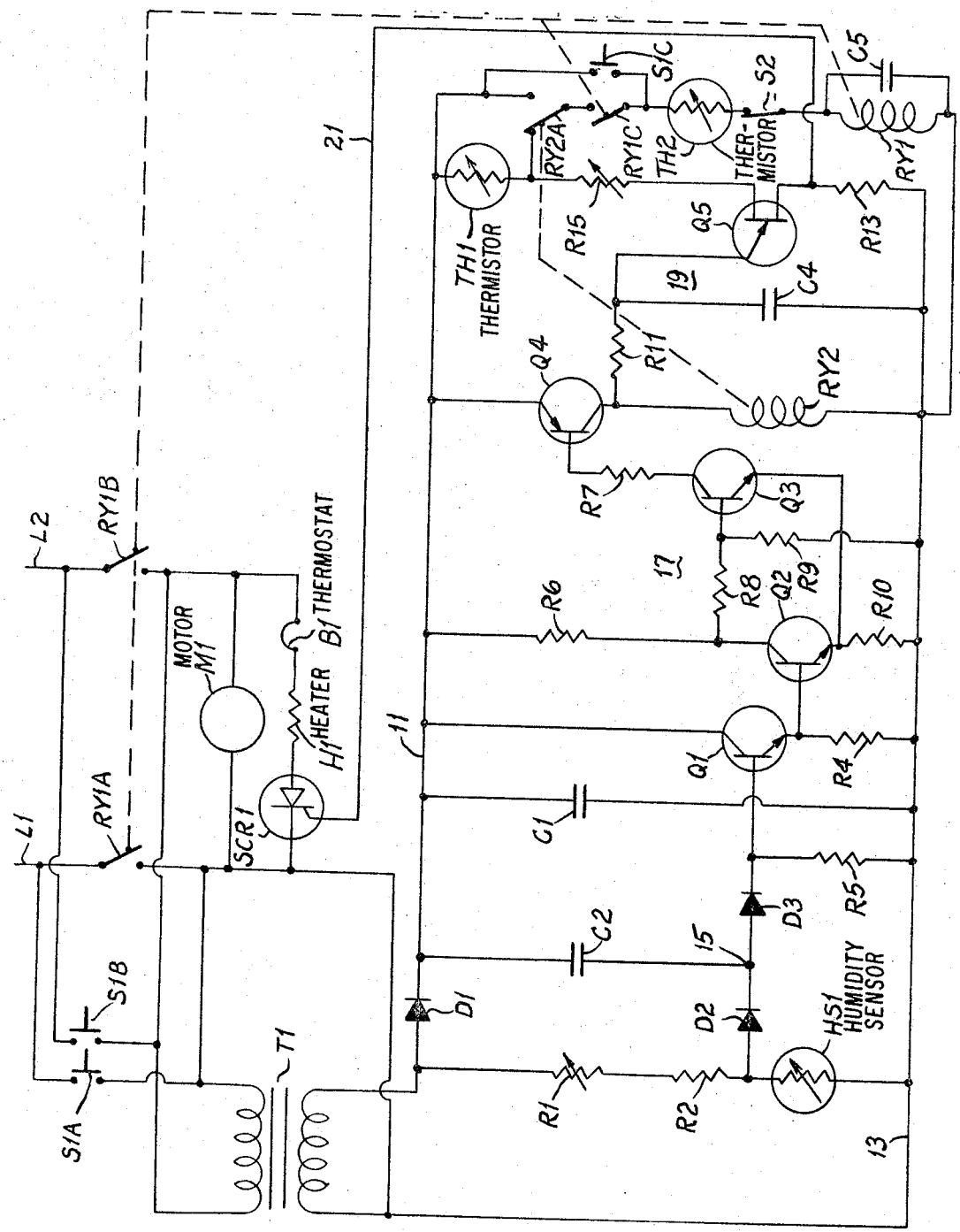

3,331,139
DRYER CONTROL
Francis Finnegan, Brockton, and Charles D. Flanagan, Attleboro, Mass., assignors to Texas Instruments Incorporated, Dallas, Tex., a corporation of Delaware
Filed Apr. 2, 1965, Ser. No. 445,091
11 Claims. (Cl. 34—45)

This invention relates to dryer controls and more particularly to methods and apparatus for regulating extent of drying, temperature and cool-down in a domestic clothes dryer.

Among the several objects of this invention may be noted the provision of a control for automatically terminating a drying cycle when a predetermined dryness is attained; the provision of an electronic system for precisely controlling the temperature within a heated drying zone; the provision of an electronic system for precisely preselecting the dryness of a clothes load to be attained at the end of a drying cycle; the provision of an automatic control for a dryer wherein, following heating, the load is cooled while being agitated and ventilated; the provision of a dryness control wherein dryness is sensed independently of temperature so that the control can be used in drying very delicate fabrics when little heat is applied; the provision of a dryness control wherein the sensing of dryness is relatively unaffected by line voltage variations; the provision of a dryness control which is responsive to the wetter item in a mixed load which includes a variety of different items; the provision of a controlled dryer of the class described wherein the motor means providing agitation and ventilation is protected against overheating; and the provision of a control system for a dryer which is relatively inexpensive, rugged and reliable in operation. Other objects and features will be in part apparent and in part pointed out hereinafter.

Briefly, this invention relates to a control for a clothes dryer provided with motor means for agitating and ventilating a load to be dried and a heater for warming the load so that its drying is accelerated. The term "clothes" is intended to include any of the various items which are typically found in a domestic laundry load. The control comprises a temperature sensor which is adapted to sense, either directly or indirectly, the temperature of the load. The temperature sensor is interconnected in a circuit which is operative, while the heater is energized, to control the temperature in the heating zone by modulating the flow of power to the heater. The control also includes a humidity sensor which is adapted to sense the varying moisture content of the various items in the load. Preferably, this sensor is of an ion exchange type which senses humidity essentially independently of temperature and which inherently is more responsive to the wetter items in a mixed load than to the drier items. The humidity sensor is interconnected in a circuit for denergizing the heater when a preselected dryness is obtained. The temperature sensor is further interconnected in another circuit, which is operative after the heater has been deenergized, for deenergizing the motor means when the temperature falls below a predetermined value. Accordingly, when the dryer ceases operation entirely, the load is both dry and relatively cool.

In a particular embodiment the temperature responsive means is a thermistor which is interconnected in a unijunction transistor oscillator circuit for varying the frequency of oscillation as a function of temperature. The oscillator triggers a silicon controlled rectifier to modulate the flow of power to the heater as an inverse function of temperature thereby maintaining the temperature of the load substantially at a preselected level.

In another specific aspect, this same thermistor is, upon deenergization of the heater, connected in series with the winding of a relay which controls the current flow to the heater whereby, when the temperature of the load falls below said preselected level, the relay changes states and the motor means is deenergized.

The invention accordingly comprises the constructions, circuits and methods hereinafter described, the scope of the invention being indicated in the following claims. The accompanying drawing is a circuit diagram illustrating the electrical components of a preferred embodiment of the present invention and their interconnection.

Referring now to the drawing, the dryer includes a motor M1 which furnishes mechanical energy for agitating and ventilating a load of clothes to be dried. The motor can, for example, rotate a perforate drum in which a load of clothes can be tumbled and drive a blower for forcing air through the drum. The particular tumbling drum and blower arrangement which can be used are conventional and, since they form no part of the present invention, are not described further herein. Motor M1 is connected, through a pair of relay contacts RY1A and RY1B, across two conductors L1 and L2 which supply power from a 115 volt A.C. source. A resistance heater H1 is also connected across lines L1 and L2 by a circuit which includes, in addition to contacts RY1A and RY1B, a silicon controlled rectifier SCR1 and a normally-closed overheat thermostat B1. Heater H1 is arranged for heating the load to accelerate its drying, typically by heating the air stream which is blown through the load for ventilation. Thermostat B1 will deenergize the heater if, for any reason, the temperature in the drying zone should reach a dangerous level. Low voltage power for the control circuitry is obtained from lines L1 and L2 through a step-down transformer T1. Alternate connections to the primary winding of transformer T1 are provided by relay contacts RY1A and RY1B and ganged starting switch contacts S1A and S1B.

The reduced A.C. voltage provided by the secondary winding of the transformer T1 is rectified by a diode D1 and filtered by a capacitor C1 to provide a D.C. voltage between the lines 11 and 13. The line 13 is connected to the cathode of the silicon controlled rectifier SCR1 so that a common potential is established between the control and heater circuits. Hereinafter all voltages are described with respect to this common potential.

The reduced A.C. voltage is also applied across a voltage divider circuit comprising, in series, a rheostat R1, a fixed resistor R2 and a variable resistance humidity sensor HS1. A preferred form of humidity sensor is the electric hygrometer disclosed in U.S. Letters Patent 2,728,831, issued Dec. 27, 1955, to Martin Pope. In that hygrometer, a resistance which varies with humidity is obtained by means of an ion exchange phenomenon taking place at the surface of a resin structure formed of a material such as polystyrene. The relationship between humidity and resistance is substantially independent of temperature and, due to the hygroscopic nature of the ion exchange surface layer, the response of the device to damp conditions is more rapid than its response to dry conditions. These sensors have the further advantage of being inherently mechanically rugged and thus can be attached directly to the dryer drum for contact with the load.

Due to the humidity dependent resistance characteristics of humidity sensor HS1, the magnitude of the A.C. voltage at the divider junction between sensor HS1 and resistor R2 will also be dependent upon the moisture present at the sensor. This varying A.C. signal is rectified by a diode D2 and filtered by capacitor C2 to provide a similarly varying D.C. signal voltage at junction 15. This D.C. signal voltage is applied, through a diode D3 and an NPN transistor Q1 connected as an emitter follower, to a Schmitt trigger circuit 17 including NPN transistors Q2 and Q3. A resistor R4 connected to the emitter of transistor Q1 is the load resistor for the emitter follower circuit. A resistor R5, connecting the base of transistor Q1 to line 13, normally biases both the emitter follower and the Schmitt trigger 17 to an "off" state in which transistors Q1 and Q2 are nonconducting.

The trigger circuit transistors Q2 and Q3 are provided with load resistors R6 and R7, respectively. A voltage divider, comprising a pair of resistors R8 and R9, is connected between the collector of transistor Q2 and line 13 and the thereby divided collector voltage is applied directly to the base of transistor Q3. An emitter resistor R10, common to the two transistors Q2 and Q3, provides the regeneration which gives the Schmitt trigger 17 its sharply defined threshold characteristics.

Load resistor R6 is conected directly to the positive line 11 while the load resistor R7 is connected to this line through the base-emitter junction of a PNP transistor Q4. Because complementary conductivity types are involved, transistor Q4 will be turned on when transistor Q3 conducts. Transistor Q4 controls a relay coil RY2 and also a unijunction transistor relaxation oscillator 19.

Relaxation oscillator 19 comprises a unijunction transistor Q5, a timing capacitor C4 which is connected between the emitter of transistor Q5 and line 13, and a timing resistor R11 through which the capacitor C4 is charged from the collector of transistor Q4. A load resistor R13 connects the base-one lead of unijunction transistor Q5 to the line 13 while the base-two lead is connected to the line 11 through a rheostat R15 and a temperature sensing thermistor TH1 which has a negative temperature coefficient.

When transistor Q4 is turned on, substantially the full D.C. supply voltage will appear across coil RY2 and timing capacitor C4 will charge through resistor R11. Under these conditions, the negative resistance characteristic of the unijunction transistor Q5 will cause the circuit 19 to undergo relaxation oscillations during which capacitor C4 is repetitively discharged through the emitter base-one circuit of transistor Q5 to generate a succession of positive-going voltage pulses across resistor R13.

Thermistor TH1 is positioned either within the dryer drum itself or in the air stream leaving the drum so that the thermistor resistance is an inverse function of the temperature of the load. As will be understood by those skilled in the art, variations in the resistance of thermistor TH1 will affect the interbase voltage of unijunction transistor Q5 and will thus vary the characteristic frequency of oscillation and the period or interval between successive pulses provided at resistor R13.

The pulses generated across resistor R13 are coupled, through a line 21, to the gate electorde of silicon controlled rectifier SCR1 to initiate firing thereof. Silicon controlled rectifiers have the characteristic that, once fired, they remain in conduction until the forward bias is removed. Accordingly, when rectifier SCR1 is fired, it will remain in conduction until the end of that A.C. half-cycle during which conduction was initiated. On each A.C. half-cycle which is of the proper polarity to permit conduction through the anode-cathode circuit of rectifier SCR1, there will typically be a delay before conduction is initiated by a pulse from the oscillator 19. The average delay will depend statistically upon the frequency of oscillation and the period or interval between pulses. A change in the average delay will vary the average interval over which rectifier SCR1 conducts and will thus vary also the power supplied to heater H1 so that the higher the frequency of oscillation, the greater will be the power supplied to heater H1. It can thus be seen that changes in the temperature of the dryer load which vary the resistance of thermistor TH1 will be effective to proportionally modulate the power supplied to heater H1. The modulation is performed as an inverse function of temperature so that the control tends to maintain the temperature of the load substantially at a predetermined level.

The particular temperature which is maintained is adjusted by setting rheostat R15 to preselect the nominal frequency of oscillation.

The thermistor TH1 is also connectable into a series circuit with a relay coil RY1 by means of the normally closed side of a set of relay contacts RY2A. Contacts RY2A are operated by the coil RY2 described previously. The series circuit to coil RY1 also includes a normally closed switch S2, a motor protection thermistor TH2 and a pair of normally open relay contacts RY1C which are operated by coil RY1 itself. Coil RY1 also operates contacts RY1A and RY1B in the supply lines L1 and L2 to control motor M. A capacitor C5 shunting coil RY1 slows its response for a purpose described hereinafter. Switch S2 is an interlock or safety switch arranged so as to be opened when the door to the dryer is opened, as a safety feature. Opening switch S2 will therefore turn off the dryer by deenergizing the relay coil RY1 and allowing contacts RY1A and RY1B to open. Thermistor TH2 is embedded in the windings of motor M1 and is of a type having a positive temperature coefficient of resistance exhibiting a sharp transition region. This thermistor is effectively operative as a switch to deenergize relay coil RY1 and deenergize the dryer if the motor M1 should overheat.

As relay coil RY2 is energized by transistor Q4 concurrently with the oscillator circuit 19 which controls the energization of the heater H1, thermistor TH1 will not be connected in series with relay coil RY1 during the time the heater is energized. During heating, coil RY1 is connected directly to line 11 through the opposite (normally open) side of relay contacts RY2A. The normally open side of contacts RY2A and contacts RY1C are bridged by a set of switch contacts S1C which are ganged for operation with contacts S1A and S1B.

The operation of this dryer control circuit in drying a load of wet clothes is as follows: To initiate the drying cycle, the ganged switch contacts S1A, S1B and S1C are closed. Contacts S1A and S1B provide power to the control circuitry through transformer T1 and contacts S1C energize the relay coil RY1 from lines 11 and 13. Coil RY1 closes relay contacts RY1A and RY1B to energize motor M1, causing the dryer to agitate and ventilate the clothing load. Contacts RY1C are also closed.

Initially, sensor HS1 is in the presence of high humidity and therefore exhibits a low resistance. Thus, when power is applied to the control circuitry through transformer T1, only a relatively small A.C. voltage will appear across the sensor HS1. Accordingly, the variable D.C. voltage applied to the Schmitt trigger circuit 17 will be below the trigger threshold. Circuit 17 will therefore remain in its "off" state in which transistor Q2 is turned off and transistor Q3 is conducting. Conduction in transistor Q3 causes concurrent conduction in transistor Q4 and energization of relay coil RY2, so that the position of the movable arm of contacts RY2A becomes the reverse of that shown in the drawing. Since contacts RY1C are closed by the prior energization of coil RY1 through switch contacts S1C, this operation of contacts RY2A establishes a holding circuit for coil RY1. The holding circuit parallels switch contacts S1C so that the starting switch (S1A, S1B and S1C) can be released.

In addition to energizing coil RY2, conduction in transistor Q4 also activates the relaxation oscillator 19. As explained previously, the positive-going pulses generated by oscillator 19 trigger silicon controlled rectifier SCR1 in such a manner that the energization of the heater H1 is dependent upon the frequency of oscillation and hence also upon the resistance of thermistor TH1, the sense of the relationship being such that the temperature in the drying zone is maintained at a constant predetermined level. Thus, while the clothes are still damp and the relay RY2 is energized, the load will be heated to accelerate its drying but the temperature will not exceed the predetermined level.

As the clothes dry, the resistance of the humidity sensor HS1 increases and the A.C. and D.C. signal voltages derived therefrom vary accordingly. When a preselected dryness, determined by the setting of R1, is reached, the D.C. signal voltage at junction 15 will exceed the threshold of the Schmitt trigger circuit 17. As will be apparent to those skilled in the art, the use of voltage divider circuitry renders the trip point relatively insensitive to supply voltage variations, such as caused by power line fluctuations. Upon tripping, this circuit will reverse states thereby causing the transistor Q4 to deenergize the relay coil RY2 and to disable the relaxation oscillator 19. The cessation of pulses from oscillator 19 will stop all conduction in rectifier SCR1 and thus deenergize heater H1. The simultaneous deenergization of coil RY2 will permit contacts RY2A to return to the position shown in the drawing, thereby connecting thermistor TH1 into a series circuit with relay coil RY1. Capacitor C5 shunting coil RY1 delays the operation of this relay and thus prevents its release during the transition of contacts RY2A.

When heater H1 is initially deenergized, thermistor TH1, which senses the temperature of the load, will exhibit a low resistance due to the heated condition of the load. Thus coil RY1 will continue to be energized after the return of contacts RY2A to the normal position. However, as the load continues to be agitated and ventilated by the continued operation of motor M1, the clothes will gradually cool down and the resistance of thermistor TH1 will increase. When a predetermined lower temperature is reached, at which the current passed by thermistor TH1 is less than the holding current of coil RY1, the complete drying cycle is terminated by the opening of contacts RY1A and RY1B which deenergizes the motor M1. The holding circuit to coil RY1 is simultaneously broken by the opening of contacts RY1C.

Thus, when the dryer ceases operation, the clothes will have been dried to the desired or preselected level of dryness without exceeding a predetermined temperature limit and will subsequently have been cooled down while being agitated and ventilated so that any stiffening of the fabrics is avoided.

It should be understood that other types of moisture sensing elements could be employed, for example, those which measure the resistance of the drying clothes mass, and that the circuitry could be otherwise modified within the teachings of the invention. Transistor conductivity types could be substituted, PNP for NPN, and solid state components such as silicon controlled rectifiers could be substituted for various of the electromechanical components such as relays.

In view of the above, it will be seen that the several objects of the invention are achieved and other advantageous results attained.

As various changes could be made in the above constructions, circuits and methods without departing from the scope of the invention, it is intended that all matter contained in the above description and shown in the accompanying drawing be interpreted as illustrative and not in a limiting sense.

What is claimed is:

1. A control system for a clothes dryer having means for agitating and ventilating a load to be dried and means for heating the load to accelerate the drying thereof, said control system comprising:

first single sensor means responsive to the temperature of the load;

means, responsive to said first sensor during heating, for proportionally modulating the application of heat to the load according to an inverse function of the temperature of the load thereby to maintain its temperature at a first preselected level;

second sensor means responsive to the dryness of the load;

means, controlled by said second sensor, for terminating the application of heat when a preselected dryness is reached; and means, responsive to said first sensor after heating has been terminated, for deenergizing the agitating and ventilating means when the temperature of the load falls below a second preselected level lower than said first preselected level whereby when said dryer ceases operation the load is dry and relatively cool.

2. A control system for a clothes dryer having motor means for agitating and ventilating a load to be dried and a heater for warming the load to accelerate the drying thereof, said control system comprising:

means for initiating a drying phase during which both said motor means and said heater are energized;

a thermistor for sensing the temperature of the load;

a first circuit, responsive to the resistance of said thermistor, for modulating the power supplied to said heater to maintain the temperature of the load at a first predetermined level while said heater is energized;

a moisture sensing element;

a second circuit, including said moisture sensing element, for deenergizing said heater when the moisture content of the load falls below a preselected level; and a third circuit, responsive to the resistance of said thermistor after said heater is deenergized by said second circuit, for deenergizing said motor means when the temperature of the load falls below a second predetermined level lower than said first predetermined level whereby when said dryer ceases operation the load is dry and relatively cool.

3. A control system according to claim 2 in which said second circuit includes a relay and said relay has contacts for interconnecting said thermistor with said third circuit when said heater is deenergized.

4. A control system according to claim 2 in which said thermistor has a negative temperature coefficient characteristic and in which said third circuit includes a relay for controlling said motor means, said relay having a control winding which is connected in series with said thermistor when said heater is deenergized, whereby said relay drops out and deenergizes said motor means when the temperature of the load falls below said second predetermined level.

5. A control system according to claim 2 in which said third circuit includes a second thermistor and said second circuit is responsive to the resistance of said second thermistor for deenergizing said motor means if the motor means overheats.

6. A control system according to claim 2 in which said first circuit includes a silicon controlled rectifier and a unijunction transistor relaxation oscillator for triggering said silicon controlled rectifier, said thermstor being connected in the base circuit of said oscillator during the application of heat to vary the interbase voltage as a function of temperature whereby the frequency of oscillation and the power passed by said silicon controlled rectifier are varied to maintain the load in the dryer at the first preselected temperature level.

7. A control system according to claim 6 in which said moisture sensing element is an ion exchange humidity sensor and in which said second circuit includes: an adjustable resistance with which said sensor is interconnected in a voltage divider; and a trigger responsive to the relative conductivities of said sensor and said resistance for deenergizing said heater.

8. A control system according to claim 7 in which said trigger deenergizes said heater by removing the supply of current from the emitter of said unijunction transistor oscillator.

9. A control system according to claim 7 in which said trigger includes a transistor Schmitt trigger and an emitter follower for driving said Schmitt trigger from said voltage divider.

10. A control system according to claim 7 further comprising means for coupling said system to a source of A.C. power and means for rectifying said A.C. power to provide direct current for the operatoin of said trigger circuit, said voltage dividing circuit being operated on alternating current whereby polarization of said ion exchange humidity sensor is prevented.

11. A control system for a clothes dryer having motor means for agitating and ventilating a load to be dried and an electric heater for warming the load to accelerate the drying thereof, said control system comprising:
   relay means for controlling said motor;
   means for initiating a drying phase during which both said motor means and said heater are energized;
   a silicon controlled rectifier for modulating the flow of electric power to said heater;
   a unijunction transistor relaxation oscillator for triggering said silicon controlled rectifier;
   a thermistor for sensing the temperature of the load, said thermistor being connected in the base circuit of said oscillator during heating for controlling its frequency of oscillation to vary the energization of said heater as an inverse function of the temperature of the load thereby to maintain the temperature at a first predetermined level;
   a humidity sensor for sensing the moisture content of the load;
   a voltage divider including said humidity sensor;
   means for applying a voltage across said divider to obtain a signal which is a function of the dryness of the load; and
   a trigger circuit, responsive to said signal, for disabling said oscillator to deenergize said heater and interconnecting said thermistor with said relay means when the load reaches a preselected dryness, said relay means being responsive to the resistance of said thermistor to deenergize said motor means when the temperature of the load falls below a second predetermined temperature, whereby when said dryer ceases operation, the load is dry and relatively cool.

References Cited

UNITED STATES PATENTS

| | | | |
|---|---|---|---|
| 2,820,304 | 1/1958 | Horecky | 34—45 |
| 3,096,971 | 7/1963 | Sidaris | 263—33 |
| 3,112,187 | 11/1963 | Stone | 34—48 X |
| 3,180,038 | 4/1965 | Chafee | 34—48 X |
| 3,229,379 | 1/1966 | Heidtmann | 34—45 |
| 3,229,380 | 1/1966 | Worst | 34—45 |

FREDERICK L. MATTESON, Jr., *Primary Examiner.*

D. A. TAMBURRO, *Assistant Examiner.*